April 21, 1970  J. E. GEE ET AL  3,507,060
SIDE CASTING CONVEYOR ATTACHMENT FOR SELF-LOADING SCRAPERS
Filed Sept. 25, 1967  4 Sheets-Sheet 1

INVENTORS
JAMES E. GEE
DORWIN R. LARSEN
BY
ATTORNEYS

April 21, 1970 J. E. GEE ET AL 3,507,060
SIDE CASTING CONVEYOR ATTACHMENT FOR SELF-LOADING SCRAPERS
Filed Sept. 25, 1967 4 Sheets-Sheet 2

INVENTORS
JAMES E. GEE
DORWIN R. LARSEN
BY
ATTORNEYS

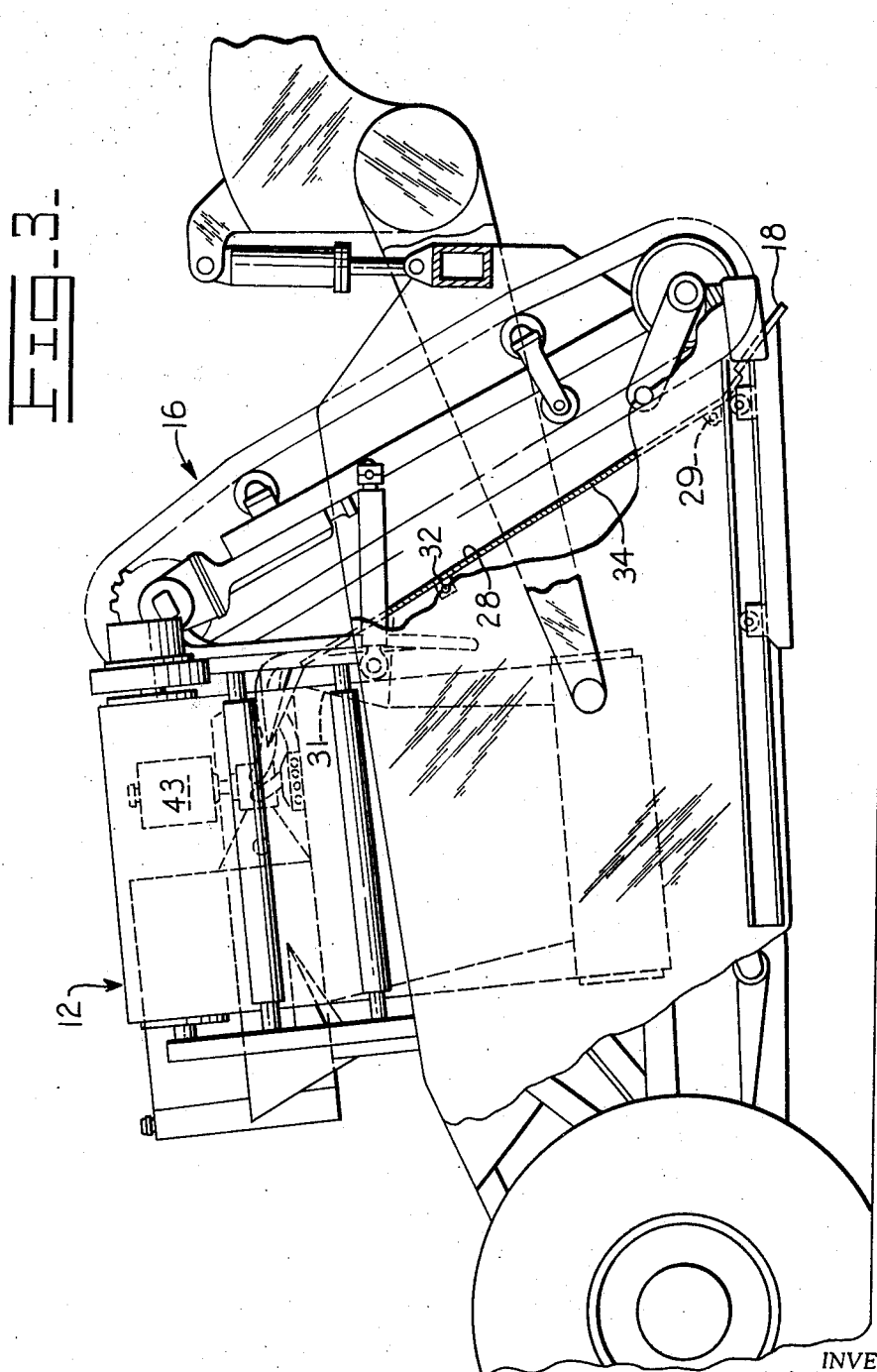

April 21, 1970 J. E. GEE ET AL 3,507,060
SIDE CASTING CONVEYOR ATTACHMENT FOR SELF-LOADING SCRAPERS
Filed Sept. 25, 1967 4 Sheets-Sheet 4
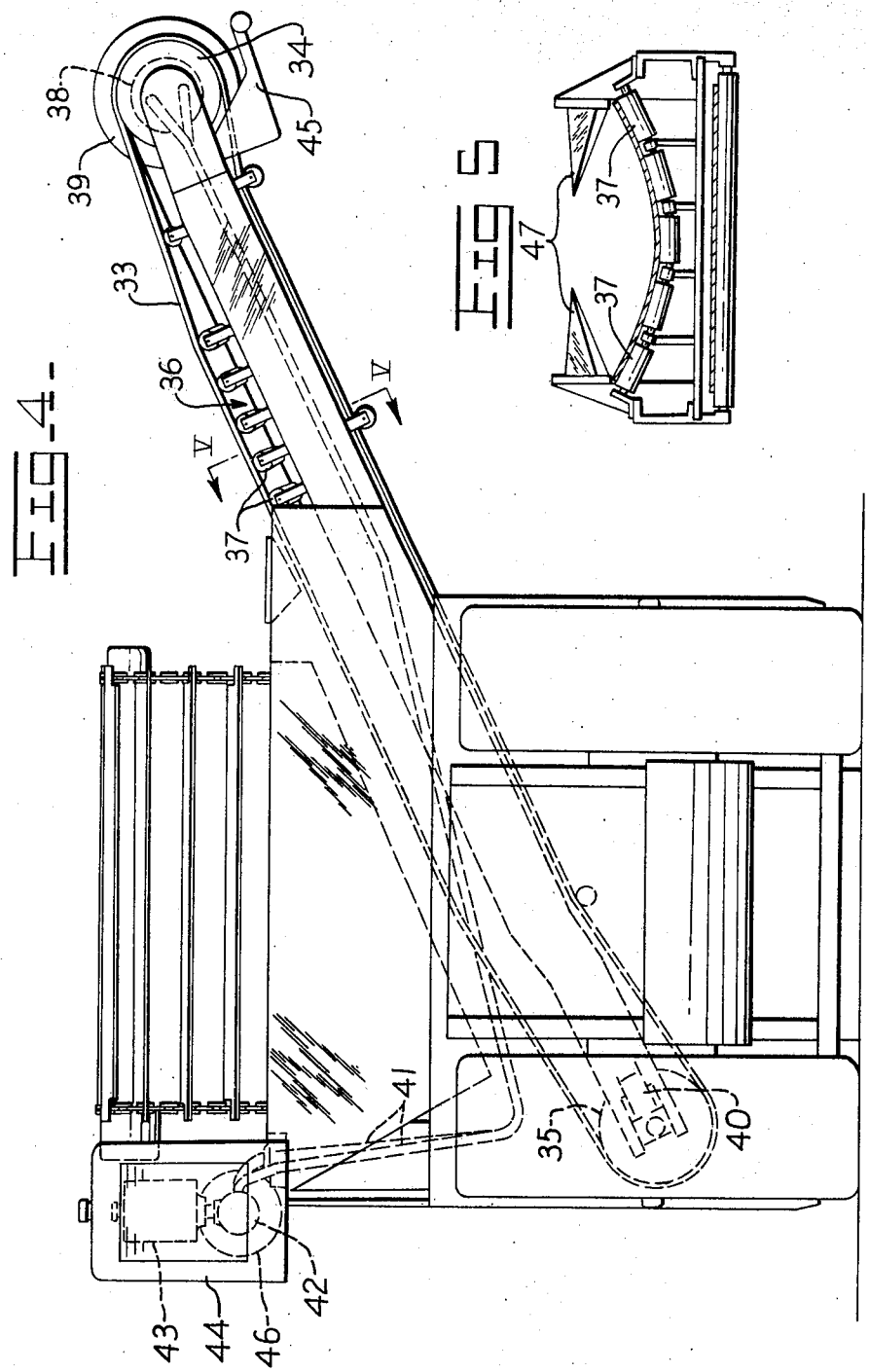
INVENTORS
JAMES E. GEE
DORWIN R. LARSEN
BY
ATTORNEYS

United States Patent Office

3,507,060
Patented Apr. 21, 1970

3,507,060
SIDE CASTING CONVEYOR ATTACHMENT FOR SELF-LOADING SCRAPERS
James E. Gee and Dorwin R. Larsen, Washington, Ill., assignors to Caterpillar Tractor Co., Peoria, Ill., a corporation of California
Filed Sept. 25, 1967, Ser. No. 670,298
Int. Cl. B60p 1/36
U.S. Cl. 37—8                                      1 Claim

ABSTRACT OF THE DISCLOSURE

A side casting conveyor attachment for association with a conventional elevator scraper, the attachment having a hopper for disposition in the scraper bowl to be loaded by the elevator, a conveyor forming the bottom of the hopper and extending outwardly past a sidewall of the bowl, self-contained motor means for the conveyor disposed in counter-balancing relation to the conveyor and pyramid shaped restricting members extending inwardly and outwardly over the endless conveyor to regulate but not to block passage of material out of the hopper upon the conveyor.

---

Typical earth-moving scrapers cut and load material such as earth or gravel after which the scraper is employed as a transport vehicle to move the loaded material to a suitable site for unloading. Due to the high rate of efficiency required in most earth-moving operations, the employment of the scraper as a transport vehicle during portion of its operating cycle is often undesirable. Such a situation arises, for example, where large amounts of earth are to be moved to a remote site and much greater efficiency would result from using the scraper only to cut and load material while employing some other means such as trucks for transport.

It is known in the prior art to employ conveyors with earth-moving machinery similar to scrapers for side-casting of material in, for example, dredging operations, or to load the material onto a suitable transport vehicle. However, such prior art devices are generally undesirable for association with an earth-moving scraper since they tend to interfere with the cutting and loading operation of the scraper as well as preventing employment of the scraper in its usual mode of operation. For example, the motor is usually balanced to provide the required amount of power for the various scraper components. Operation of a conveyor from the same motor requires either the provision of additional power or a sacrifice in the operating characteristics of the scraper. Also, where the conveyor is constructed as a permanent component of the scraper, it prevents intermittent use of the scraper in its conventional operating cycle of loading, transporting, and unloading.

Accordingly, it is an object of the present invention to provide a side casting attachment for scrapers comprising a hopper which is readily disposable in the scraper bowl, a conveyor extending from the hopper past a sidewall of the scraper bowl for side-casting of material therefrom and self-contained motor means to provide for operation of the conveyor independently of operation of said scraper components and without placing additional power requirements on the scraper engine. The present conveyor attachment, which is preferably for association with a self-loading scraper of the type having an elevator, provides a compact side casting attachment which cooperates with but does not interfere with the loading operation of the scraper. Since the attachment is almost completely contained within the scraper bowl, it does not add to the length of the scraper nor does it substantially increase its size so that maneuverability of the scraper with the side casting attachment disposed thereon is similarly unaffected. Since the side casting conveyor attachment is also readily removable as a unit, the scraper may be intermittently operated either in a conventional manner or in combination with the side casting attachment.

A further object is the provision of means which regulate but do not block the passage of material upon a conveyor.

Other objects and advantages of the present invention will be made apparent in the following description and the accompanying drawings wherein FIG. 1 is a perspective illustration of the present side casting conveyor attachment showing the manner in which it is associated with a conventional self-loading scraper;

FIG. 3 is a side elevation view of the conveyor attachment disposed in the bowl of an elevating scraper;

FIG. 4 is a rear elevation view similar to FIG. 3; and

FIG. 5 is a cross-section view of the conveyor taken along section line V—V of FIG. 4.

Figure 1:
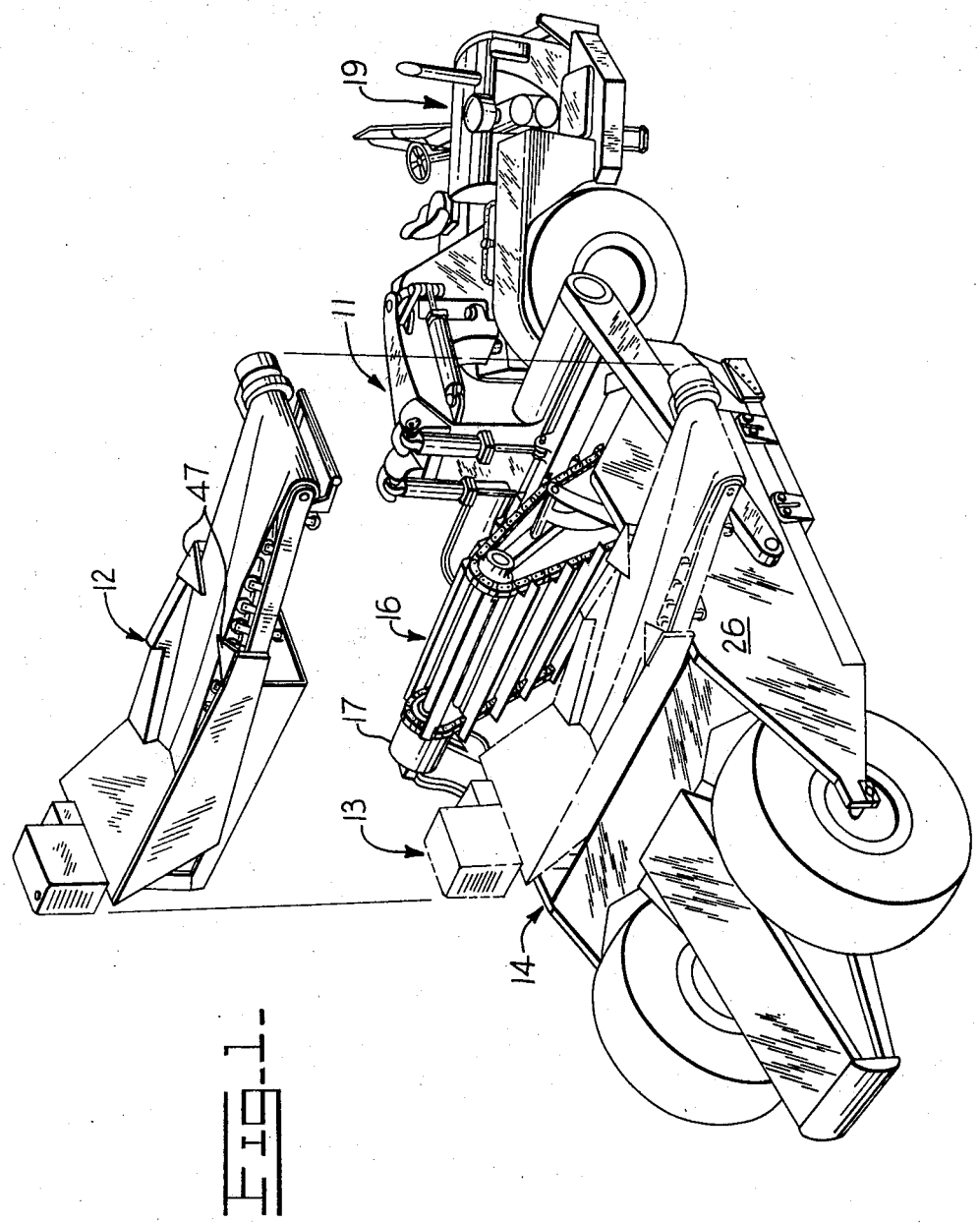

Referring now to FIG. 1, a self-loading scraper 11 is illustrated with a side casting conveyor attachment 12 shown in broken lines. The attachment is also shown in full lines as it would appear upon being raised upwardly away from the scraper. Having reference also to FIG. 3, the scraper has an elevator 16 driven by a motor 17 and cooperating with a cutting edge 18 disposed at the forward open end of the scraper bowl to assist with the loading of material into the bowl. The present scraper is also of a type having an ejector plate (not shown) for unloading material from the bowl. This ejector plate, which is normally disposed at the rear of the bowl during loading, has been removed from the scraper to permit the side casting attachment to have a greater width and load carrying capacity. The side casting attachment, to be described below, is designed for the side casting or loading of material into large trucks or wagons at a rate of, for example 3000 cubic yards per hour or more.

Figure 2:
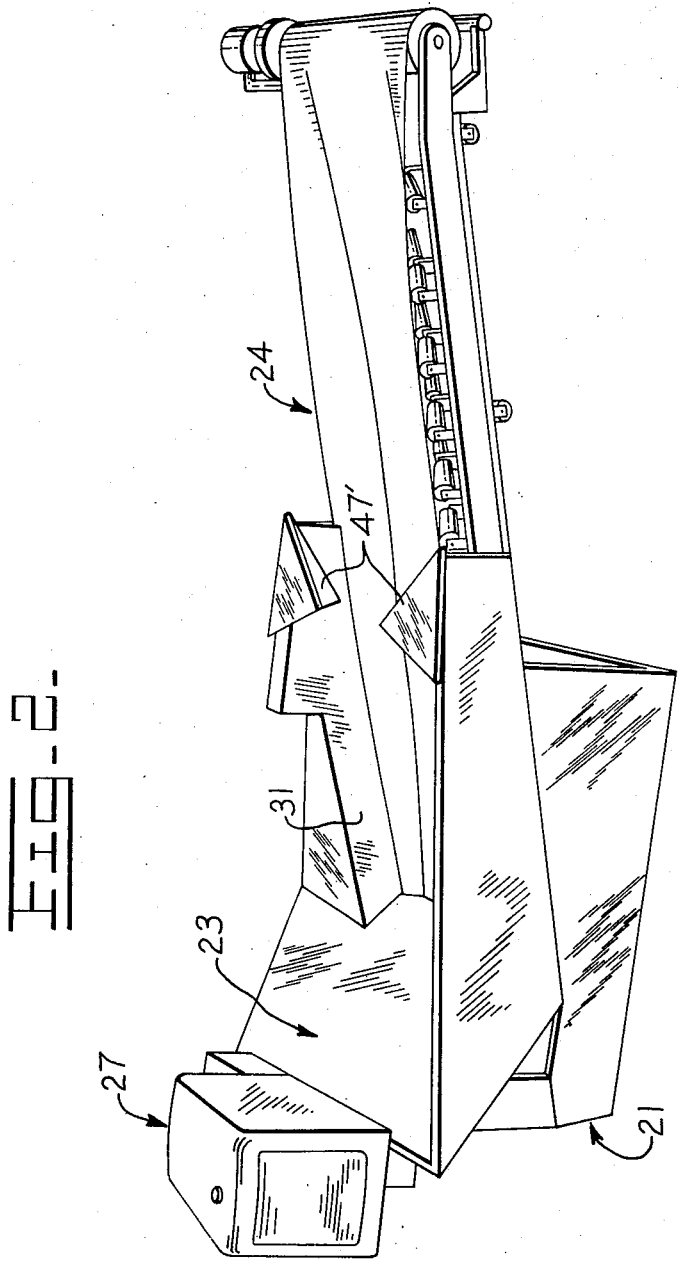
FIG. 2 is an enlarged perspective view of the side casting attachment.

The side casting attachment is illustrated in FIG. 2 and has a framework 21 which is to be disposed in the scraper bowl. The framework is shaped similar to the bowel interior so that the attachment is held in place by its own weight. It may also be desirable to provide channeling on the bowl interior to prevent shifting of the attachment or to lightly weld the framework to the bowl for the same purpose. The attachment has a hopper 23 for receiving material loaded by the elevator. A conveyor 24 forms the bottom of the hopper and extends beyond a side wall 26 (see FIG. 1) of the scraper bowl for side casting of material therefrom. The side casting attachment also has a self-contained motor 27, for driving the conveyor, which is preferably disposed upon the attachment in counter-balancing relation to the conveyor to reduce stresses in the scraper bowl and the attachment. The self-contained motor, in addition to not interfering with the balanced power provided for the scraper, is operable independently of the other scraper components so that, in combination with the hopper, it permits continuous loading operation of the scraper even during interchanging of transport trucks to receive material from the conveyor. For example, after one truck is loaded, then to fifteen seconds may be required to replace the loaded truck with another truck. With the present arrangement, the hopper has sufficient capacity to retain material loaded by the scraper during this interval even though the conveyor is not operating. The conveyor, which will be described in detail below, is capable of removing material from the hopper faster than it is loaded thereinto. Thus, substantially the full capacity of the hopper is available during interchange of trucks to permit continuous scraper operation.

To assist the elevator in loading material into the hopper, a backup plate 28 (see FIG. 3) is pivotally secured to the scraper bowl floor at 29 adjacent the cutting edge and extends upwardly in general alignment with the elevator to overhand a forward wall 31 of the hopper. The backup plate and the elevator form a channel through which material is moved from the cutting edge into the hopper of the side casting attachment. To provide for efficient loading under varying soil conditions, the backup plate is pinned to the bowl sidewalls, for example, at 32, so that the upper end of the backup plate may be moved toward or away from the elevator.

Referring now particularly to FIG. 4, the conveyor assembly 24 comprises an endless flexible belt which is driven by a drive pulley 34 at the extended end of the conveyor. Rollers 36 which support the belt and material carried thereon have upwardly angled end portions 37 (see FIG. 5) which permit the belt to assume a troughed configuration. A primary purpose for troughing the belt is to increase its capacity while also reducing friction between material being discharged and sidewalls (not shown) which may optionally be employed along the extended portion of the conveyor. An idling roller 35 at the lower end of the conveyor has a conventional tensioning means 40 which are hydraulically adjusted to regulate tension in the belt.

The conveyor drive comprises a hydraulic motor 38 in driving association with the drive pulley 34 through suitable speed reducing means 39. Such a driving arrangement is of a type conventionally employed, for example, to drive the scraper elevator. Fluid for driving the hydraulic motor 38 is circulated trough a pair of conduits 41 which are in communication with the motor and a hydraulic pump 42. The pump is of a type having a valve operable by the scraper operator to either drive the motor or permit free recirculation of fluid to the pump. The hydraulic pump has a fluid reservoir 43 and is driven by an engine 44 through a clutch 46. The engine, clutch, pump and oil reservoir are mounted above and to one end of the conveyor attachment, opposite the extended conveyor end to provide the counter-balancing relation described above. A safety stop or rest 45 is provided below the drive pulley 39 to protect the components at the extended end of the conveyor from damage caused for example by contact with a transport vehicle.

Referring now particularly to FIGS. 2 and 5, guide elements 47 are disposed on the hopper at each side of the conveyor belts at a point where the conveyor extends from the hopper. These guide elements extend inwardly over the belt and outwardly toward its extended end to restrict or regulate but not to block passage of material from the hopper along the conveyor belt. As shown, these guide elements may be plates as illustrated at 47 in FIG. 1 or pyramid shaped members as illustrated at 47′ in FIG. 2. The guide members prevent material from exiting the hopper along the edges of the belt and thus tend to prevent spillage from the belt during discharge. Regulation of material flow by the guide elements is particularly important to regulate hopper discharge during the interval for changing trucks. When loading of an empty truck commences, the large quantities of material in the hopper are prevented from overflowing from the belt. The guides also urge large rocks or lumps of material into the center of the belt with a minimum of restricting action, but do not block or jam the passage of large rocks because of the space provided between the two guide members.

We claim:
1. A unitary side casting conveyor attachment for association with an earthmoving scraper having a bowl into which material is to be loaded, the bowl including sidewalls and a floor forming an open forward end in the bowl with a self-loading elevator inclined upwardly and rearwardly at the forward open end of the bowl for normally assisting with the loading of material into the bowl, comprising a hopper for disposition in the scraper bowl, the hopper including supporting framework which conforms with a portion of the bowl interior for positioning the hopper within the bowl, the hopper also including means for cooperation with the elevator to enable the hopper to receive material normally loaded into the scraper bowl, a conveyor assembly forming a bottom of said hopper, said conveyor assembly having an inclined, endless belt supported on rollers, said endless conveyor extending transversely beyond the hopper and one of the bowl sidewalls for side casting of material from the hopper, said conveyor assembly also including a drive pulley at the extended end thereof for receiving the endless belt, a hydraulic motor being connected to said pulley through speed reducing means, and restrictive means for regulating the movement of material from the hopper on the conveyor, said conveyor belt having a suitable width and being operable at a speed sufficient to remove material from the hopper at a greater rate than that with which material is provided to the hopper by the elevator, at least one of said rollers comprising angularly disposed segments to permit troughing of the belt, said restricting means being defined as members extending inwardly and outwardly above the endless conveyor from respective sides thereof generally at a point where the conveyor extends transversely from the hopper, said restricting members terminating in spaced apart relation above the conveyor, and self-contained motor means associated with said conveyor assembly to provide driving power thereto, said motor means being mounted on the conveyor attachment in counterbalancing relation to the transversely extending portion of the conveyor assembly so that the conveyor attachment is secured within the bowl substantially by its own weight, said motor means comprising an engine having a remotely operable clutch and a hydraulic pump associated with the engine to be driven thereby, the engine and pump being mounted above and at an end of the hopper opposite the extended conveyor end, said pump being communicated with said hydraulic motor by suitable conduits for transmission of fluid therethrough.

References Cited
UNITED STATES PATENTS 2,430,282  11/1947  Ensinger _____ 198—57
2,543,519   2/1951  Baechli _____ 198—57
2,298,472  10/1942  Dudley _____ 198—57

ROBERT E. PULFREY, Primary Examiner

E. H. EICKHOLT, Assistant Examiner

U.S. Cl. X.R.

37—110, 129; 198—203